Patented Aug. 28, 1928.

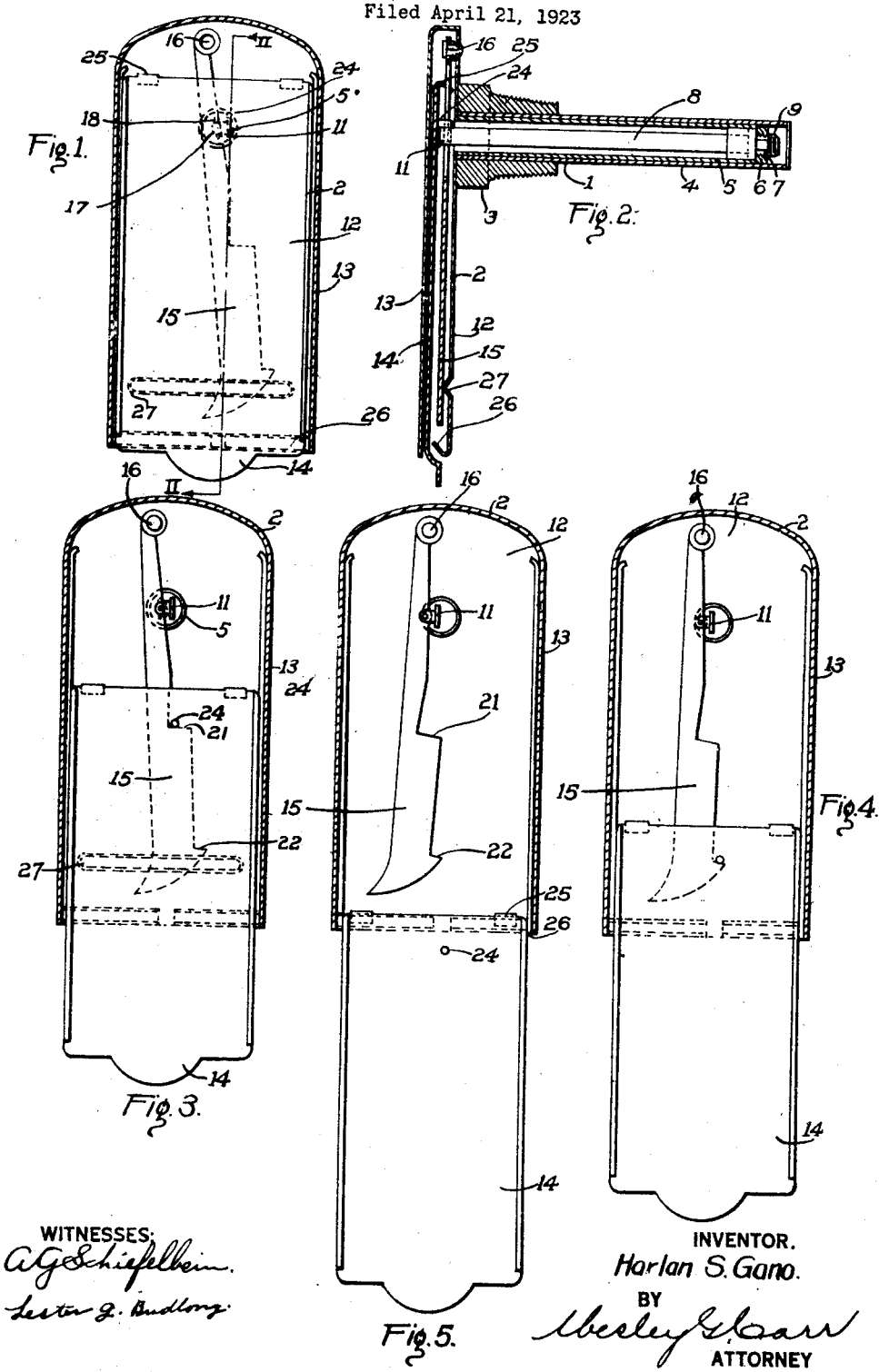

1,682,498

UNITED STATES PATENT OFFICE.

HARLAN S. GANO, OF WILKINSBURG, PENNSYLVANIA, ASSIGNOR TO WESTINGHOUSE ELECTRIC & MANUFACTURING COMPANY, A CORPORATION OF PENNSYLVANIA.

TRANSFORMER-LOAD INDICATOR.

Application filed April 21, 1923. Serial No. 633,803.

My invention relates to temperature indicating devices and more particularly to such devices as are adapted to be employed in connection with transformers or other apparatus embodying liquid-containing tanks.

One object of my invention is to provide a temperature indicating device which is adapted to indicate a plurality of critical temperatures.

Another object of my invention is to provide a temperature indicating device that is adapted to expose increasing areas of target in accordance with rises in temperature of a medium surrounding the device.

It is a further object of my invention to provide a temperature indicating device that is adapted to expose increasing areas of target in accordance with corresponding changes in the ambient temperature of a portion of the device.

It is still another object of my invention to provide a thermal indicator with means for successively exposing a plurality of surfaces of different colors upon the occurrence of predetermined thermal conditions in the device being protected.

In temperature indicators of this type, as heretofore constructed, slidably mounted targets have been employed which are exposed as a whole upon the occurrence of a critical thermal condition in the device being protected. Under many conditions it is not only advisable, but necessary to know when a device reaches each of a plurality of thermal conditions.

My invention provides a thermal indicator in which a slidably mounted target is adapted to be exposed in steps, each step corresponding to a certain predetermined temperature of the surrounding medium. The target may be painted a plurality of colors in order that a visible indication of the exact condition obtaining in the device may be had at a relatively great distance.

In the accompanying drawings:

Figure 1 is a face view, partially in section, of a temperature indicator in its closed position and embodying my invention.

Fig. 2 is a sectional view thereof taken along the section line II—II of Fig. 1.

Fig. 3 is a view of the temperature indicator shown in Fig. 1, in the first position in its operation.

Fig. 4 is a face view of the temperature indicator shown in Fig. 1, in an intermediate position.

Fig. 5 is a face view of the temperature indicator shown in Fig. 1, in the extreme position of its operation.

In the several figures of the drawings, similar reference numerals indicate the same parts.

In the preferred form of my invention, a thermo-responsive device 1, adapted for insertion into a liquid-filled tank, comprises a frame 2. The thermo-responsive device 1 comprises a threaded bushing 3 in which is secured a tube 4, a second tube 5 pivotally secured within the tube 4, a partition 6 provided with a threaded opening 7, and a bimetallic member 8 supported, as at 9, in the threaded opening 7. The free end portion 11 of the bimetallic member 8 projects beyond the end of the tube 5 into the frame 2.

The frame 2 comprises a base plate 12 which is secured to the inner tube 5, an outer cover 13, a slidably mounted target 14 and a lever 15 pivotally mounted, as at 16, on the base plate 12. The free end portion 11 of the bimetallic member 8 is secured by a pin 17 to a slot 18 in the lever 15. The lever 15 is provided with shoulders 21 and 22.

A projection 24 is mounted on the inner face of the target 14. A pair of ears 25 which are secured at the upper edge of the target 14, are adapted, under circumstances, to be hereinafter described to engage the bent-up portion 26 at the bottom of the base plate 12. The base plate 12 is crimped, as at 27, whereby it is adapted to engage the lower portion of the lever 15.

In the operation of my temperature indicator, the liquid surrounding the tube 4 becomes heated by any external agency. The resulting thermal changes are transmitted through the tubes 4 and 5 until the temperature of bimetallic member 8 is increased with a corresponding characteristic bending or warping. In the form of my invention shown in the accompanying drawings, the member 8 is mounted in such manner that any bending results in a displacement of the end 11 toward the left of Figs. 1, 3, 4 and 5. By proper design of the bimetallic member 8, the amount of displacement of its free end portion 11 can be made to indicate a predetermined temperature in the liquid surrounding the tube 4.

In the closed position of my temperature indicator, shown in Fig. 1, the projection 24 rests upon the end of the bimetallic member 8. After a predetermined displacement of the end portion 11, it moves from under the projection 24 with the result that the target 14 moves downwardly, under the influence of gravity, until the projection 24 engages the shoulder 21, as is shown in Fig. 3.

Continued heating of the bimetallic member 8 results in a further displacement of the end 11 with the result that the lever 15 further moves against the friction of the portion 27 to the left as viewed in Fig. 3. When this movement is sufficient to permit the shoulder 21 to become disengaged from the projection 24, the target 14 falls by force of gravity, until the projection 24 engages the shoulder 22, as is shown in Fig. 4.

Further increase in temperature of the bimetallic member 8 results in additional movement of the lever 15 to the left thereby withdrawing the shoulder 22 from the projection 24, whereupon the target 14 falls until the ears 25 engage the upturned portion 26 of the base plate 12. Further downward movement of the target 14 is thereby prevented. It is to be observed that a plurality of intermediate shoulders may be placed between the shoulders 21 and 22 in case indication of smaller temperature changes are desirable.

The areas of the target 14 that are exposed at each of the several steps, are preferably painted different colors, as for example, green, red and blue. A two-fold visual indication of the thermal condition of the device under control is thus given, the first being the area of the target 14 which is exposed, and the second being the color scheme which is exposed by the target 14. Notice of the thermal condition of the device under control is thus given to an attendant who may take such steps as may be deemed necessary for relieving such conditions.

After the bimetallic element has cooled sufficiently to retract the lever 15 into the position shown by Fig. 1, the target 14 may be pressed upwardly until the projection 24 engages the lower extremity of the lever 15, whereupon the lever 15 is deflected to the left as viewed in Fig. 1 against the inherent resiliency of the bimetallic member 8. The projection 24 slips over the shoulders 21 and 22 and finally comes to rest above the end 11 of the bimetallic strip 8, as is shown in Fig. 1.

In my invention, indication is given of the progressive thermal changes in a device under control by means of the relative movement of a target. This target may be provided with a multi-colored surface so that indication of the thermal condition may be seen from a considerable distance.

Various modifications in the system and arrangement and location of parts may be made within the spirit and scope of my invention, and such modifications are intended to be covered by the appended claims.

I claim as my invention:

1. In combination, a frame, a lever mounted in said frame, a target slidably mounted in said frame, a thermo-responsive member projecting into said frame for actuating said lever, said target being adapted to engage said lever at a plurality of points in accordance with changes in the condition of said thermo-responsive member.

2. In combination, a frame, a lever mounted in said frame, a target slidably mounted in said frame, a thermo-responsive member projecting into said frame and engaging said lever, said target being adapted to engage said lever at a plurality of points in accordance with changes in the condition of said thermo-responsive member.

3. In combination, a frame, a lever provided with a plurality of shoulders mounted in said frame, a target slidably mounted in said frame, a thermo-responsive member projecting into said frame and engaging said lever, said target being adapted to successively engage the several shoulders on said lever.

4. The combination with a thermo-responsive member comprising a threaded bushing, a tube secured in said bushing, a second tube pivotally mounted in the first named tube, a bimetallic element supported in said first named tube and extending through the second named tube, of an indicator comprising a frame secured to said second named tube, a lever provided with a plurality of shoulders mounted on said frame, a target slidably mounted in said frame, a thermo-responsive member projecting into said frame and engaging said lever, said target being adapted to successively engage the several shoulders on said lever.

5. In an indicator, a frame, a lever provided with a plurality of shoulders mounted on said frame, a target slidably mounted in said frame, provided with means for selectively engaging said shoulders, a bimetallic member extending into said frame and engaging said lever whereby said target is successively released from the several shoulders and permitted to fall to the next lower shoulder in accordance with the predetermined conditions of said thermo-responsive member.

6. An indicating device comprising, in combination, a gravity-actuated vertically slidable target, a pivotally mounted lever, provided with means for holding said target in one of a plurality of successive positions in accordance with the angular position of the lever relative to the target, said lever being rotatable in a plane parallel to the plane of the target, and a thermo-responsive element for actuating said lever whereby the target may be released in step-by-step movements in accordance with the thermal condition of the thermo-responsive element.

7. An indicating device comprising, in combination, a gravity-actuated vertically slidable target, a pivotally mounted lever, means cooperating with said target and lever whereby said target may be held in a plurality of positions in accordance with the angular position of said lever relative to the target, and thermo-responsive means for actuating said lever to change its angular position in accordance with the thermal condition of said thermo-responsive means, whereby said target may be released from one position to another in successive movements.

In testimony whereof, I have hereunto subscribed my name this 14th day of April, 1923.

HARLAN S. GANO.